United States Patent [19]

Seifert et al.

[11] 4,166,598
[45] Sep. 4, 1979

[54] VEHICLE ENSHROUDING APPARATUS

[75] Inventors: Clair F. Seifert, Newport Beach; Harvey S. Seapy, Manhattan Beach; David E. Dunlap, Mission Viejo, all of Calif.

[73] Assignee: The United States of America as represented by the Secretary of the Air Force, Washington, D.C.

[21] Appl. No.: 474,479

[22] Filed: May 30, 1974

[51] Int. Cl.² .............................................. B64G 1/00
[52] U.S. Cl. .................................... 244/160; 244/158; 244/163
[58] Field of Search ................................ 244/158–160, 244/163; 102/105

[56] References Cited
U.S. PATENT DOCUMENTS 3,220,004  11/1965  Gillespie, Jr. ....................... 244/158
3,405,886  10/1968  Gosnell et al. ...................... 244/158

Primary Examiner—Charles T. Jordan
Attorney, Agent, or Firm—Joseph E. Rusz; Arsen Tashjian

[57] ABSTRACT

Stowable and inflatable apparatus for enshrouding a vehicle. The apparatus, in its most generic and most basic embodiment, includes an inflatable framework external of which is attached a multilayer superinsulating blanket shroud. The inflatable tubular framework includes a plurality of inflatable tubular-shaped longitudinal members in spaced-apart relationship, and a plurality of inflatable toroidal-shaped members also in spaced-apart relationship. Each of the toroidal-shaped members is positioned essentially perpendicular to, and in contact with, each of the tubular-shaped longitudinal members. The inventive apparatus solves the problems which are inherent in enclosing a large, relatively hot space vehicle to retain the heat therefrom, and in folding (and stowing) and in unfolding an apparatus in a space environment.

5 Claims, 2 Drawing Figures

VEHICLE ENSHROUDING APPARATUS

BACKGROUND OF THE INVENTION

This invention relates to a vehicle enshrouding apparatus which is stowable, i.e., foldable and, more particularly, to an embodiment thereof adapted for use in a space environment for enclosing a large, relatively hot space vehicle in that environment.

There are many well known problems associated with attempting to accomplish the goal of retaining the heat being emitted, or the like, from a large, relatively hot space vehicle. It is fair and accurate to state in regard thereto that what is needed in the art, and is not presently available, is an apparatus which can effectively enclose said large, relatively hot space vehicle with a thermal blanket. A problem related to that accomplishment is that the heat-retaining apparatus should be stowable until needed.

We have invented an apparatus which overcomes these problems, and which attains the long-sought goals of heat-retainability and of stowability. Therefore, we have significantly advanced the state-of-the-art.

SUMMARY OF THE INVENTION

This invention pertains to a vehicle enshrouding apparatus adapted for use in retaining the heat emitted by a large, relatively hot space vehicle.

The principal object of this invention is to provide a stowable apparatus for retaining the heat from a large, relatively hot space vehicle by enclosing the vehicle with a thermal insulating blanket.

This principal object, and other objects and ones related thereto, of this invention will become readily apparent after a consideration of the description of our invention and reference to our drawings.

DESCRIPTION OF THE PREFERRED EMBODIMENT

Figure 1:
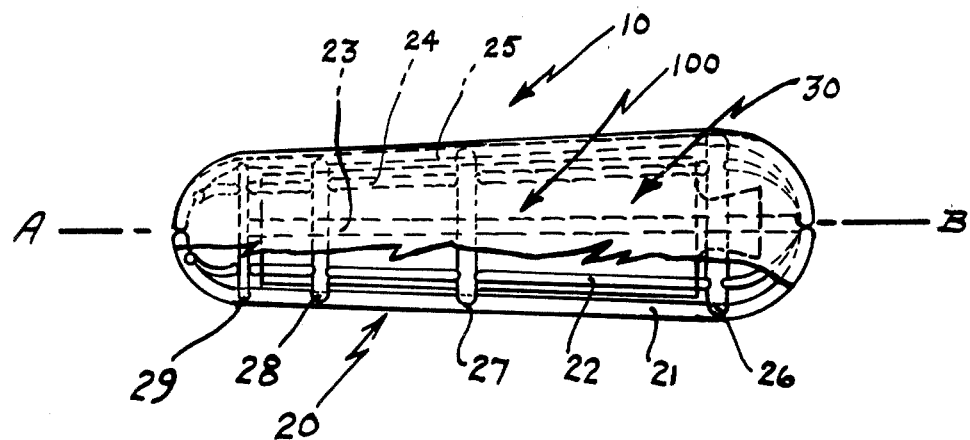
FIG. 1 is a side elevation view, in schematic form and partially fragmented, of a preferred embodiment of our invention; and, FIG. 2 is an end view in schematic form and simplified, of the preferred embodiment shown in FIG. 1.

With reference to FIG. 1, therein is shown a preferred embodiment 10 of our invention.

The preferred embodiment 10, in its most generic and most basic form, includes: an inflatable frame (or framework) 20; and, a multilayer thermal superinsulating blanket shroud 30 external of, and attached to, said inflatable frame 20.

More specifically, the inflatable frame 20 further includes: a plurality of inflatable tubular-shaped longitudinal members, such as 21-25, which are in spaced-apart relationship as shown in FIG. 1; and, a plurality of inflatable torodial-shaped members, such as 26-29, which also are in spaced-apart relationship. As a matter of preference, and not of limitation, our inflatable frame 20 comprises eight of the said tubular-shaped longitudinal members and four of the said inflatable toroidal-shaped members. As a related matter, it is here to be noted that each of the plurality of toroidal-shaped members, such as representative ones 26-29, is positioned essentially perpendicular to, and in contact with (such as by attachment to), each of the plurality of the tubular-shaped longitudinal members, such as representative ones 21-25.

Also shown in FIG. 1, in phantom, are: the large, relatively hot space vehicle 100 which is enclosed by embodiment 10 of our inventive stowable and inflatable apparatus for enshrouding a vehicle; and, geometric longitudinal axis A-B of space vehicle 100.

Figure 2:
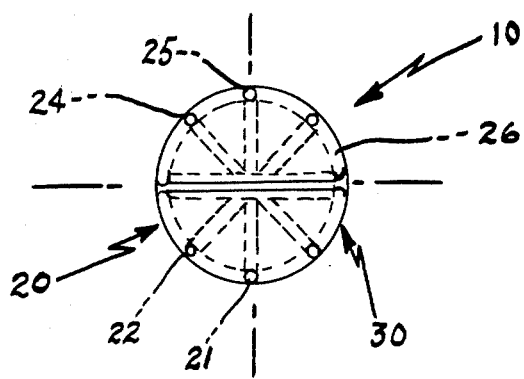

With reference to FIG. 2, which is a simplified end view of our embodiment 10, FIG. 1, not including therein the space vehicle 100, shown are: the multilayer thermal superinsulating blanket shroud 30; and, in phantom, representative inflatable tubular-shaped longitudinal members 21, 22, 24 and 25, and representative inflatable toroidal-shaped transverse member 26.

The inflatable tubes, both of the longitudinal configuration and of the toroidal configuration, are made preferably of two sheets of 0.35 mil Mylar (a polyester film) bonded to each other and to a reinforcing Dacron (a polyester fiber) net (scrim) by suitable means, such as a modified polyimide adhesive, and are formed into spliced tubular shapes to make the aforesaid longitudinal and toroidal members, such as 21-29, FIGS. 1 and 2.

The multilayer superinsulation shroud 30, FIGS. 1 and 2, is made of a plurality of laminates, preferably ten of them. Each of the plurality of laminates is made preferably of 0.25 mil Kapton (a polyimide film), with a 0.18 mil aluminum foil bonded by suitable means (such as a modified polyimide adhesive) on both faces of the film. Each laminate (i.e., each layer) is separated by a 0.25 mill Dacron net spacer element. The shroud 30 has outer layers which are perforated to allow the escape of entrapped air, if any, when compressing the shroud (and, of course, the inventive apparatus 10 as a whole).

MANNER OF OPERATION OF THE PREFERRED EMBODIMENT

The manner of operation of the preferred embodiment is self-evident from the foregoing description, together with an examination of FIGS. 1 and 2.

In essence, if the inventive apparatus 10 is stowed (as it is structured to be), the apparatus 10 is removed from stowage; the inflatable members, such as 21-29, are inflated by suitable means; and, the space vehicle, such as 100, is enclosed (i.e. surrounded) by the blanket, such as 30, to which are attached the inflated members which comprise the frame.

To stow the apparatus 10, the process is reversed, including the evacuation of the inflating medium from the inflated members, 21-29, FIGS. 1 and 2, with the resultant deflation of said members.

CONCLUSION

It is clearly evident from all of the foregoing, and from FIGS. 1 and 2, that the principal object of our invention has been attained.

It is to be noted that, although there have been described the fundamental and unique features of our vehicle enshrouding apparatus, as adapted for a particular use and as applied to a preferred embodiment, various other embodiments, substitutions, additions, omissions, adaptations, and the like, will occur to, and can be made by, those of ordinary skill in the art, without departing from the spirit of our invention.

What is claimed is:

1. A stowable apparatus for enshrouding a large, relatively hot space vehicle, comprising:

a. an inflatable frame which includes:

(1) a plurality of inflatable tubular-shaped longitudinal members in spaced-apart relationship;

(2) and, a plurality of inflatable toroidal-shaped members in spaced-apart relationship;

wherein each of said plurality of inflatable toroidal-shaped members is positioned essentially perpendicular to, and in contact with, each of said plurality of inflatable tubular-shaped longitudinal members;

b. and, a multilayer thermal superinsulating blanket shroud external of, and attached to, said inflatable frame.

2. An apparatus, as set forth in claim 1, wherein each of said plurality of inflatable tubular-shaped longitudinal members is made of a plurality of 0.35 mil polyester film sheets bonded to each other and to a reinforcing net of polyester fiber.

3. An apparatus, as set forth in claim 1, wherein each of said plurality of inflatable toroidal-shaped members is made of a plurality of 0.35 mil polyester film sheets bonded to each other and to a reinforcing net of polyester fiber.

4. An apparatus, as set forth in claim 1, wherein said multilayer thermal superinsulating blanket shroud is made of a plurality of laminates, with each said laminate made of a 0.25 mil a polyimide film interposed between and bonded to two 0.18 mil sheets of aluminum foil, and with each said laminate of said plurality of laminates separated from each other by a 0.25 mil a polyester fiber net element.

5. An apparatus, as set forth in claim 4, wherein said multilayer thermal superinsulating blanket shroud includes a plurality of outer layers, with said outer layers being perforated.

* * * * *